United States Patent
Gilmour et al.

(10) Patent No.: US 9,115,006 B2
(45) Date of Patent: Aug. 25, 2015

(54) GAS BUBBLE GENERATION FOR COALESCING

(75) Inventors: Jason Gilmour, Huntington Beach, CA (US); William A. Greene, Long Beach, CA (US)

(73) Assignee: Spintek Filtration, Inc., Los Alamitos, CA (US)

( * ) Notice: Subject to any disclaimer, the term of this patent is extended or adjusted under 35 U.S.C. 154(b) by 1202 days.

(21) Appl. No.: 13/005,335

(22) Filed: Jan. 12, 2011

(65) Prior Publication Data
US 2011/0168640 A1    Jul. 14, 2011

Related U.S. Application Data

(60) Provisional application No. 61/335,963, filed on Jan. 14, 2010.

(51) Int. Cl.
| | | |
|---|---|---|
| *B01D 1/00* | (2006.01) | |
| *B03B 5/60* | (2006.01) | |
| *B03D 1/00* | (2006.01) | |
| *C02F 1/24* | (2006.01) | |
| *B01F 3/04* | (2006.01) | |
| *B01F 5/04* | (2006.01) | |
| *B01F 5/06* | (2006.01) | |
| *B01F 15/00* | (2006.01) | |
| *B03D 1/02* | (2006.01) | |
| *B03D 1/04* | (2006.01) | |
| *B03D 1/24* | (2006.01) | |
| *B03D 1/14* | (2006.01) | |

(52) U.S. Cl.
CPC ............ *C02F 1/24* (2013.01); *B01F 3/04503* (2013.01); *B01F 5/0451* (2013.01); *B01F 5/0465* (2013.01); *B01F 5/0653* (2013.01); *B01F 5/0657* (2013.01); *B01F 15/00136* (2013.01); *B01F 15/00162* (2013.01); *B01F 15/00357* (2013.01); *B03D 1/028* (2013.01); *B03D 1/04* (2013.01); *B03D 1/1475* (2013.01); *B03D 1/247* (2013.01); *B01F 2215/0431* (2013.01); *B01F 2215/0468* (2013.01); *B03D 1/245* (2013.01); *C02F 2209/005* (2013.01); *C02F 2209/38* (2013.01)

(58) Field of Classification Search
None
See application file for complete search history.

(56) References Cited

U.S. PATENT DOCUMENTS

| | | | | |
|---|---|---|---|---|
| 4,282,105 | A | * | 8/1981 | Crowe .......................... 210/798 |
| 4,695,789 | A | * | 9/1987 | Lambertz et al. ............. 324/690 |
| 5,174,944 | A | * | 12/1992 | LeBeck ......................... 266/252 |
| 6,068,779 | A | | 5/2000 | Dzhragatspanyan et al. |
| 6,949,195 | B2 | | 9/2005 | Morse et al. |
| 2002/0195398 | A1 | * | 12/2002 | Morse et al. .................. 210/705 |

FOREIGN PATENT DOCUMENTS

WO    WO 03/008959 A1    1/2003

* cited by examiner

*Primary Examiner* — Nam Nguyen
*Assistant Examiner* — Richard Gurtowski
(74) *Attorney, Agent, or Firm* — Leon D. Rosen; Timothy Thut Tyson

(57) ABSTRACT

A system is provided for introducing gas bubbles (usually air bubbles) into a liquid stream to coalesce material such as unwanted bits, or particles, of hydrocarbons that lie in the liquid stream along with wanted dissolved bits of metal, for removal of the hydrocarbons. The system is constructed to produce a large number of bubbles of an optimum range such as 60 to 100 μm which best coalesce the hydrocarbons. A controller receives the outputs of sensors such as pressure and flow rate sensors (P, F) and uses them to make changes in other parameters such as the pressure of air introduced into the liquid stream and the pressure in a third conduit of the liquid-bubble stream.

5 Claims, 1 Drawing Sheet

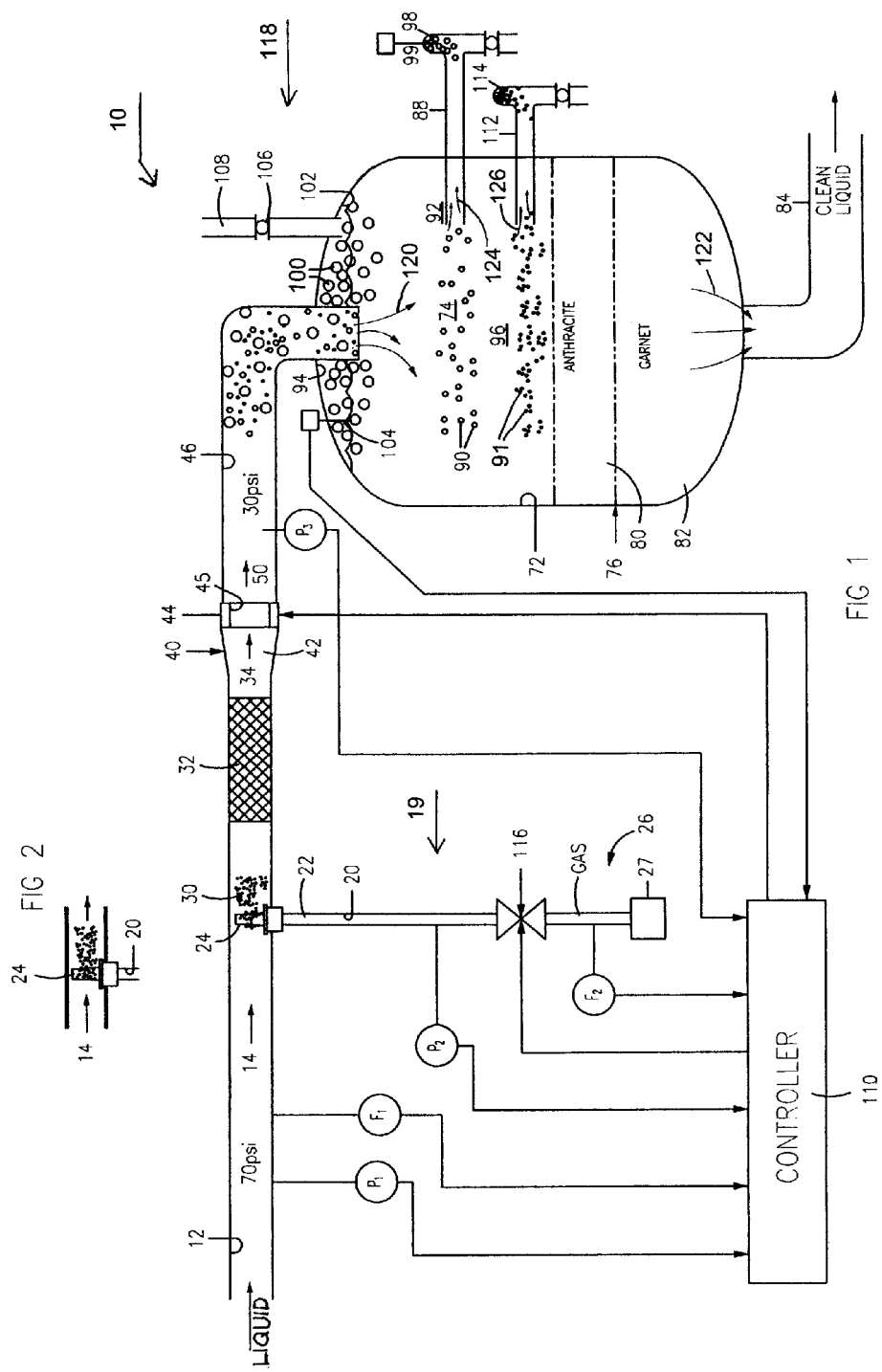

GAS BUBBLE GENERATION FOR COALESCING

CROSS-REFERENCE

Applicant claims priority from U.S. Provisional Patent Application Ser. No. 61/335,963 filed Jan. 14, 2010.

BACKGROUND OF THE INVENTION

Many processes such as the mining of copper and nickel ore, produce molecule-size bits that are wanted such as dissolved bits of copper or nickel, and also produce undissolved bits or particles of material such as liquid hydrocarbons. Liquid organics (compounds such as hydrocarbons that contain carbon) can be removed from a stream by introducing gas bubbles, which are usually air bubbles, into the liquid stream. In a separation chamber, gas bubbles in a predetermined size range, such as 60 μm to 100 μm (2.4 to 4 thousandths inch) cling to the unwanted organic undissolved particles and allow them to be separated from wanted dissolved bits. The bubbles keep the organic particles that flow into a separation chamber, from flowing into a media bed from which almost all remaining contaminants including organic particles, are removed. Instead, the organic particles with gas bubbles in the predetermined size range clinging to them, can be removed from the middle of the separation chamber. This prevents the media bed from rapidly becoming clogged with organic bits, and therefore avoids the need to often clean the media bed.

Gas bubbles, which are herein sometimes referred to as air bubbles, can be produced by flowing pressured air through an air diffuser ("bubble device") into a pressured liquid stream. The diffuser has one or more tiny holes that emit bubbles into the liquid stream. If the bubbles that enter the separation chamber are too large, the bubbles rapidly float to the top of the separation chamber without clinging to organic particles, and are removed without doing any work. If the bubbles are too small, they rapidly move into the media bed and tend to clog the media bed. Only those bubbles of a predetermined size range such as 60 μm to 100 μm cling to the unwanted particles, or bits, and remain near the middle of the separation chamber from which they are removed. An important problem in the separation of organic particles from wanted bits is the control of bubble size, so as to maintain a large proportion of bubbles in the predetermined size range that effectively remove organic undissolved particles from a separation chamber.

SUMMARY OF THE INVENTION

A system and method are provided for minimizing the clogging of the media bed in an ore coalescing chamber. A bubble generator apparatus is provided for the generation of air bubbles for the separation of unwanted undissolved particles or bits, from wanted dissolved bits in the liquid stream, which produces a high proportion of bubbles in the predetermined size range. An initial conduit receives a fluid stream under pressure that contains the wanted and unwanted bits. The bubble generator apparatus includes a source of pressured air that forces air through a diffuser that has tiny holes, to generate bubbles to flow with the liquid stream in the initial conduit and through a mixer. The combination emanating from the mixer passes through a pressure dropping device that reduces the pressure of the combination before its entrance into a separation chamber. In the separation chamber, large bubbles having diameters greater than 100 μm float to the top and are removed, and small bubbles having diameters less than 60 μm flow into a coalescing media bed and tend to clog it. Bubbles in the predetermined size range having diameters from 60 μm to 100 μm cling to unwanted particles and keep them floating in the separation chamber until they are removed from the chamber. The bubbles of the predetermined size range do not cling to dissolved wanted bits, which pass through the coalescing media bed with minimal clogging of the media.

The system maintains a high proportion of bubbles of a diameter on the order of magnitude of 80 μm, and preferably of a size range in the separation chamber which is usually 60 μm to 100 μm, by providing sensors and valves and by providing a controller that varies operating parameters of the system based on the sensor outputs. A diffuser valve controls the flow rate and pressure of air that is introduced into the liquid stream to create bubbles in the predetermined size range. A pressure dropping valve controls the amount of pressure drop in the liquid-air bubble stream before it enters the separation chamber. If too many large bubbles are present in the separation chamber, the controller operates the pressure dropping valve to increase the pressure of the mixture entering the separation chamber. If too many small bubbles are generated, then the controller operates the pressure dropping valve to decrease the pressure of the mixture entering the separation chamber.

The novel features of the invention are set forth with particularity in the appended claims. The invention will be best understood from the following description when read in conjunction with the accompanying drawings.

DESCRIPTION OF THE DRAWINGS

FIG. 1 is a schematic diagram of a system for minimizing clogging of the media bed in an ore coalescing chamber.

FIG. 2 is a side elevation view of an air diffuser for generating bubbles.

DESCRIPTION OF THE PREFERRED EMBODIMENTS

FIG. 1 illustrates a coalescing system 10 that includes an initial conduit 12 that carries a fluid stream that includes a primarily liquid stream 14 under a pressure P1 such as 70 psi (30 psi to 140 psi) and a flow velocity F1 such as 15 feet per second (7 to 30 fps). In one example, the fluid stream includes dissolved bits of copper and nickel that lie in an acid-water solution such as sulfuric acid and water, along with undissolved particles of hydrocarbons.

A bubble generator apparatus 19 injects bubbles into the liquid stream. The bubbler generator apparatus includes a diffuser conduit 20 that carries gas 22 under a pressure P2 such as 5 psi (preferably 2 to 10 psi) above the pressure at P1 in the liquid stream 14 and at a gas flow velocity F2 such as 15 feet per second (7 to 30 fps) from a source 26 of pressured air to a diffuser 24 in the liquid stream 14. The initial pressure of the liquid stream in initial conduit 12 is at least 70 psi and the pressured air or other gas in diffuser conduit 20 is more than 1 psi greater. The source 26 includes a pump, pressured container 27, or other supply of pressured air and a diffuser valve 116 for reducing the pressure. The fluid stream 14 flows across a bubble generator, or diffuser 24. FIG. 2 shows one example of such a diffuser 24 which is a porous mass. In most cases the gas used to create bubbles is air, and the use of the term air includes any gas. A large number of initial tiny air bubbles 30 pass downstream out of the diffuser into the liquid stream to a mixer 32 where the bubbles and liquid are mixed.

Such a mixer 32 can include a pipe with a screw that has external threads that extend through the pipe.

The initial liquid bubble mixture 34 emanating from the mixer 32 and containing liquid, wanted dissolved bits and unwanted undissolved particles or bits, and air bubbles passes through a pressure-dropping device 40 that reduces the pressure from about 70 psi to about 30 psi in a mixed conduit 46. One example of a pressure dropping device 40 includes a tapered conduit portion 42 of increasing diameter which drops the pressure of the fluid stream passing through it. In addition, a controllable variable pressure-dropping valve 44 is included with a variable aperture 45 through which the liquid, or fluid stream 50 passes. The reduced pressure liquid-bubble mixture 50 that exits the pressure-dropping device 40 has a pressure P3 which decreases to 30 psi during a period of about 2 to 5 seconds. During this time the bubbles have entered the separation chamber 72 and are close to or in the middle portion 96 of the separation chamber.

The reduced pressure liquid-bubble mixture 50, which includes the original primarily liquid stream 14 and bubbles, enters a separation device that has a wide separation chamber 72. The fluid stream 74 in the separation chamber contains bubbles of a range of sizes, with those bubbles of about 60 μm to 100 μm diameter (2.4 to 4 thousandths inch) being the most useful in this application. The separation chamber 72 is used to separate out unwanted particles of organics, which are primarily hydrocarbon particles, from dissolved bits of wanted material such as copper, nickel and cobalt dissolved in acid. The wanted dissolved metal bits preferably move downward through a coalescing media bed 76 that may include a layer 80 of crushed anthracite followed by a layer 82 of crushed garnet. The media bed 76 removes any remaining organic particles and other contaminants, and the wanted bits pass out of the separation chamber through a feed outlet 84. If only the media bed 76 were used to remove unwanted particles of organics, the media bed would rapidly clog and would have to be repeatedly cleaned, usually while the process is discontinued.

Most of the unwanted organic particles can be removed by the bubbles 90 in the predetermined size range with diameters from 60 μm to 100 μm in this application. The bubbles in the predetermined size range cling to the unwanted organic particles lying in the middle portion 96 of the separation chamber 72 and separate the unwanted particles from the wanted bits. The unwanted particles with the bubbles 90 in the predetermined size range are removed through a bubble removal conduit 88. The bubbles in the predetermined size range cling to the unwanted particles and tend to float them towards the top 94 of the separation chamber about as fast as they tend to flow down with the liquid stream into the media bed 76. As a result, the unwanted particles remain in the middle portion 96 of the separation chamber so they flow with liquid out of the chamber through the bubble removal conduit 88. The flow of unwanted particles and fluid may be treated and dumped into a waste disposal area. A bubble trap 98 and bubble sensor 99 can lie along the bubble removal conduit 88 (with the trapped bubbles repeatedly removed) to allow the detection of the amount of bubbles in the predetermined size range that lie in the middle of the separation chamber.

Large bubbles 100, such as those of a diameter greater than about 100 μm in this application, float to an upper capture portion 102 of the separation chamber that includes the top 94. A large bubble sensor 104 senses when a sufficient quantity of the large bubbles have accumulated and operates a purge valve 106 that opens to allow the removal of the large bubbles through a large bubble-carrying pipe 108. In this way, a large bubble sensing device 118, formed by the top 94, bubble sensor 104, and purge valve 106, senses the amount, or rate of generation, of large bubbles 100.

It is important to establish the least amount of small bubbles in the separation chamber 72. If a large quantity of small bubbles (e.g. less than 60 μm diameter) enters the separation chamber then these small bubbles tend to flow down into the media bed 76 and clog it. If too many large bubbles 100 enter the separation chamber then this results in too few bubbles in the predetermined size range and results in more unwanted organic particles entering the media bed and clogging it.

The coalescing system 10 of FIG. 1 includes sensors, including pressure sensors P1, P2, and P3 and flow rate sensors F1 and F2 that sense conditions that affect bubble size in the separation chamber 72. The coalescing system also includes operable devices including variable pressure dropping valve 44 and diffuser valve 116 that can affect conditions to control bubble size in the separation chamber. The controller 110 of the coalescing system receives the outputs of the sensors and adjusts the operable devices to produce optimum coalescing system operation, primarily by producing a large number of bubbles of a predetermined size range such as 60 μm to 100 μm in the middle portion 96 of the separation chamber 72. This involves producing a minimum number of small bubbles having diameters less than 60 μm which can clog the media bed 76, and by producing a minimum number of large bubbles having diameters greater than 100 μm which interfere with the production of bubbles in the predetermined size range.

The rate of production of large bubbles in the separation chamber 72, based on the volume of such bubbles, can be measured in a number of ways. One way is by determining the time between occasions when the large bubble sensor 104 senses that the upper capture portion 102 at the top 94 of the separation chamber is full (e.g. when the sensor senses air instead of liquid). Another way is by sensing the times between the large bubble sensor 104 opening the purge valve 106 to allow the escape of large bubbles 100 through a large bubble pipe 108. When the controller 110 detects excess production of large bubbles, the controller further opens variable pressure dropping valve 44 to decrease the pressure at sensor P3. This can be done by further opening variable aperture 45 of the pressure dropping device 40 to allow a more rapid flow of the liquid stream into the separation chamber 72.

The rate of production of small bubbles having diameters less than 60 μm can be determined in a number of ways. One way is by capturing small bubbles and liquid in bubble conduit 112 that are about to enter the media bed 76 and detecting how often a bubble chamber 114 fills with air after which the air is released. The volume of small bubbles having diameters less than 60 μm versus the volume of bubbles having diameters from 60 μm to 100 μm can be calculated by the controller 110. If the volume of small bubbles is excessive compared to the volume of bubbles in the predetermined size range, then the pressure of air applied to the diffuser conduit 20 is reduced to increase the bubble size of the initial bubbles 30. The pressure of air at diffuser 24 is controlled by diffuser valve 116. The controller 110 repeatedly measures the volume of the large bubbles in the sensing device 118 and the volume of the small bubbles in the bubble chamber 114 in addition to measuring the volume of bubbles in the predetermined size range from 60 μm to 100 μm in the sensor 99. The controller is programmed to adjust the air pressure at the initial bubbles 30 by adjusting the diffuser valve 116 to try to obtain a minimum volume of small bubbles and a maximum volume of bubbles in the predetermined size range. The volume of large bubbles is allowed to increase moderately, so long as the volume of small bubbles is minimized and the volume of bubbles in the predetermined size range is not too small.

If reduced bubble size is wanted in order to produce fewer large bubbles, the pressure of the reduced pressure liquid-bubble mixture 50 is increased (at P3). This is done by opening the variable aperture 45 of variable pressure dropping valve 44. If increased bubble size is desired to reduce the number of small bubbles that clog the media bed 76), the pressure of the reduced pressure liquid-bubble mixture 50 is reduced by partially closing the variable aperture 45 of variable pressure dropping valve 44.

If air pressure 22 in bubble generator apparatus 19 is increased, the bubbles will coalesce producing large bubbles in the separation chamber 72. The rate of air flow through the diffuser 24 into the initial conduit 12, determines the range of sizes of the air bubbles (as adjusted by variable aperture 45 of variable pressure dropping valve 44). A small flow of air flow results in small bubbles such as a range of diameters of 10 to 30 μm (a majority of the bubbles are in that range). A larger air flow rate (by increasing air pressure using diffuser valve 116) increases the bubble size range such as between 30 to 200 μm, while also increasing the quantity of bubbles and their flow rate. To obtain a limited range such as 60 μm to 100 μm in the separation chamber 72, the air flow into the diffuser 24 is limited to produce a small initial range such as 10 to 40 μm. Downstream of pressure dropping device 40, the pressure decreases and the range becomes 60 to 100 μm. If the pressure started with a low pressure in the initial conduit 12 and did not use a pressure dropping device 40, the bubble size range would be larger.

The size range of bubbles in a liquid can be the mean (halfway between extremes), median (half larger and half smaller), mode (most frequent size), etc. The size range can be initially determined by taking a sample of the liquid in a tall transparent tube, and allowing the bubbles to rise to a pressured air-liquid surface that lies near the top of the tube. A magnifying glass can be used to determine the sizes of bubbles that rise past a certain location in the tube. In an alternative, the rate of bubble rise in the liquid indicates the size of the bubbles. A count of the number and size of bubbles per unit time (e.g. second) crossing the certain location can be used to determine the bubble size range. The size range resulting from given parameters (pressure and flow rate of initial liquid, pressure and flow rate of air into a given diffuser, and parameters of pressure dropping device 40) can be noted, and this size range is predicted when the same parameters are in use.

Thus the invention provides a coalescing system having an apparatus for generating air bubbles and introducing them into a liquid stream containing wanted particles, such as bits of copper and nickel dissolved in a liquid (e.g. acid) and contaminated with organic particles, to produce coalescing that removes the unwanted organic particles. The size of bubbles that will be present in a coalescing separation chamber is optimized to produce a high volume of bubbles in the predetermined size range and a minimum volume of small bubbles that are smaller than the predetermined size range, while, as a secondary consideration, producing a minimum volume of large bubbles that are larger than the predetermined size range. A controller is provided that senses the pressure of an initial liquid stream that contains the wanted particles and organic bits in a liquid, but with a large amounts of bubbles. The controller also senses the pressure of air (or other gas) that is introduced into the liquid stream, in addition to sensing the pressure of the liquid-bubble stream after passing through a pressure drop device including a controllable variable pressure drop valve. The controller also senses the amount (e.g. volume) of bubbles of different sizes produced per unit time, as by sensing the volume of bubbles smaller and bubbles larger than the predetermined size range. The controller operates valves to increase and/or decrease the pressure of air introduced into the liquid stream and to vary the drop in pressure through and slightly beyond (e.g. 2 to 5 seconds beyond) the pressure dropping valve, to obtain a minimum number (and preferably a minimum volume) of small bubbles that are smaller than the predetermined size range while obtaining a large volume of bubbles in the predetermined size range, preferably with a minimum of large bubbles that are larger than the predetermined size range.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A system for minimizing clogging of a coalescing media bed (76) in an ore coalescing separation chamber (10) that uses gas bubbles in a predetermined size range to remove undissolved particles from an initial liquid stream (14), comprising:

an initial conduit that receives the initial liquid stream (14) under pressure;

bubble generator apparatus (19) that includes a source (26) of pressured gas that forces gas at a selected pressure through a diffuser conduit (20) and through a diffuser (24) that flows initial bubbles (30) into said initial liquid stream (14) in said initial conduit (12) and that creates a mixture of said initial liquid stream (14) and said initial bubbles (30) in said initial conduit (12);

a pressure dropping device (40) connected to said initial conduit (12) that reduces the pressure of said mixture to produce a reduced pressure liquid stream (50) having bubbles in a predetermined size range with diameters from 60 μm to 100 μm, large bubbles (100) with diameters greater than said predetermined size range, and small bubbles with diameters less than said predetermined size range;

a separation chamber (72) having a top (94), an upper capture portion (102), an upper portion (92), a middle portion (96), and feed outlet (84) that passes said liquid stream (50) from said top (94) toward said feed outlet (84);

said upper capture portion (102) has a large bubble purging device (118) for said large bubbles including a large bubble sensor (104), a purge valve (106), and a large bubble pipe (108) that receives said reduced pressure liquid stream (50), and collects said large bubbles (100) as they float to said upper capture portion (102) where they accumulate until they push said liquid stream (50) below said large bubble sensor (104) which activates said purge valve (106) to expel said large bubbles (100) from said separation chamber (72) through said large bubble pipe (108);

a controller (110) that detects the amount of said large bubbles (100) in said separation chamber (72), and that operates said bubble generator apparatus (19) to reduce the pressure of applied gas when the rate of production of said large bubbles (100) increases; and, said middle portion (96) has a bubble removal conduit (88) for receiving said bubbles in said predetermined size range from the liquid stream (50), said bubbles in said predetermined size range carrying the undissolved particles by coalescing with said undissolved particles and floating towards said top (94) about as fast as the undissolved particles tend to flow down with said liquid stream (50) therefore remaining in said middle portion (96) and flowing with liquid out of said separation chamber through said bubble removal conduit.

2. The system described in claim 1, further including: said middle portion (96) having a small bubble conduit (112) at said coalescing media body (76) that removes said small bubbles from said liquid stream (50) at said coalescing media bed (76).

3. The system described in claim 2, further including: a small bubble chamber (114) on said small bubble conduit (112) that fills with gas from said small bubbles and releases said gas when said small bubble chamber (114) is full; and, said controller (110) determining the volume of said small bubbles at said coalescing media bed (76) by how often said gas in said small bubble chamber (114) is released.

4. The system described in claim 2, further including: said controller (110) repeatedly measuring the volume of the said large bubbles (100), the volume of said small bubbles, and the volume of said bubbles in said predetermined size range and adjusting said selected pressure at said diffuser (24) and said pressure dropping device (40) to obtain a minimum volume of said small bubbles at said coalescing media bed (76) that clog said coalescing media bed (76).

5. The apparatus described in claim 1, wherein said separation chamber (72) further includes:
  a bubble trap (98) on said bubble removal conduit (88) that fills with gas as said bubbles in said predetermined size range are removed from said separation chamber (72);
  a small bubble conduit (112) on said middle portion (96) at said coalescing media bed (76) for capturing said small bubbles that are about to enter said coalescing media bed (76), said small bubble conduit (112) having a small bubble chamber (114) that fills with gas as said small bubbles are captured and releasing said gas when full;
  said controller (110) detecting how often said bubble trap (98) for said bubbles in said predetermined size range fills with gas, how often said small bubble chamber (114) fills with gas, and calculating the volume of said bubbles in said predetermined size range versus the volume of said small bubbles, and reducing the pressure of gas applied to said diffuser (24) to increase the bubble size of said initial bubbles (30) when the volume of said small bubbles is excessive to minimize the clogging of said coalescing media bed (76) by said small bubbles.

* * * * *